United States Patent [19]
Khatri et al.

[11] Patent Number: 5,568,611
[45] Date of Patent: Oct. 22, 1996

[54] UNAUTHORIZED ACCESS MONITOR

[75] Inventors: Bharat Khatri, Boca Raton; Fred Marx, Coconut Creek, both of Fla.; Dan E. Mayer, Austin, Tex.; Cynthia M. Merkin, Lake Worth; Ileana Vila, Boca Raton, both of Fla.

[73] Assignee: International Business Machines Corporation, Armonk, N.Y.

[21] Appl. No.: 282,348

[22] Filed: Jul. 29, 1994

[51] Int. Cl.⁶ ............................. G06F 13/00; H04L 9/00
[52] U.S. Cl. ..................... 395/186; 380/23; 312/223.2
[58] Field of Search ................................ 395/575, 800, 395/725, 325, 186, 188.01; 380/23; 312/223.2

[56] References Cited

U.S. PATENT DOCUMENTS

| | | | |
|---|---|---|---|
| 4,099,722 | 7/1978 | Rodesch et al. | 273/143 R |
| 5,313,596 | 5/1994 | Swindler et al. | 395/725 X |
| 5,323,291 | 6/1994 | Boyle et al. | 395/800 X |
| 5,397,176 | 3/1995 | Allen et al. | 312/223.2 |
| 5,406,261 | 4/1995 | Glenn | 340/571 |
| 5,422,953 | 6/1995 | Fischer | 380/23 |

*Primary Examiner*—Robert W. Beausoliel, Jr.
*Assistant Examiner*—Ly V. Hua
*Attorney, Agent, or Firm*—George E. Grosser; Keith L. Hargrove; Andrew J. Dillon

[57] ABSTRACT

An information processing system comprises a system processor, an information storage circuit for storing at least programs for operating the information processing system; an enclosure for enclosing the information processing apparatus, the enclosure including an opening for providing access to the information processing system; a cover attached to the enclosure, the cover providing an open position and a closed condition for the information processing apparatus; detection circuitry for detecting whether the cover is in the open position; and means for stopping information processing by the information processing system responsive to an indication that the cover is in the open condition.

4 Claims, 3 Drawing Sheets

5,568,611

UNAUTHORIZED ACCESS MONITOR

BACKGROUND OF THE INVENTION

This invention relates generally to personal computers, and particularly to a personal computer having a removable computer peripheral.

Personal computer systems in general and IBM personal computers in particular have attained widespread use for providing computer power to many segments of today's modern society. Personal computer systems can usually be defined as a desk top, floor standing, or portable microcomputer that consists of a system unit having a single system processor and associated volatile and non-volatile memory, a display monitor, a keyboard, one or more diskette drives, a fixed disk storage, and an optional printer. One of the distinguishing characteristics of these systems is the use of a motherboard, or system planar, to electrically connect these components together. These systems are designed primarily to give independent computing capability to a single user and are inexpensively priced for purchase by individuals or small businesses. Examples of such personal computer systems are IBM's PERSONAL COMPUTER XT and AT and IBM's PERSONAL SYSTEM/2 Models 25, 30, 35, 40, 50, 55, 56, 57, 60, 65, 70, 80, 90, and 95.

These systems can be classified into two general families. The first family, usually referred to as Family I Models, use a bus architecture exemplified by the IBM PERSONAL COMPUTER AT and other "IBM compatible" machines. The second family, referred to as Family II Models, use IBM's MICRO CHANNEL bus architecture exemplified by IBM's PERSONAL SYSTEM/2 Models 50 through 80. Many Family I models have used the popular INTEL 8088 or 8086 microprocessor as the system processor. These processors have the ability to address one megabyte of memory. Certain Family I and most Family II models typically use the high speed INTEL 80286, 80386, 80486, and Pentium microprocessors which can operate in a real mode to emulate the slower speed INTEL 8086 microprocessor or a protected mode which extends the addressing range from 1 megabyte to 4 Gigabytes for some models. In essence, the real mode feature of the 80286, 80386, and 80486 processors provide hardware compatibility with software written for the 8086 and 8088 microprocessors.

PCs are particularly useful in a client-server environment where at least one PC system can be used as a server and other units, connected to the server, share the server's resources. Servers must often meet certain security requirements, possibly to notify the user of tampering. An unauthorized user may system may tamper with a system while running the authorized user's operating system (and application programs) and the authorized user may not be notified of the tampering until the next time the system is either powered off and then on or rebooted.

SUMMARY OF THE INVENTION

Briefly, in accordance with the invention, an information processing system comprises a system processor, information storage means for storing at least programs for operating the information processing system; an enclosure for enclosing the information processing apparatus, the enclosure including an opening for providing access to the information processing system; a cover attached to the enclosure, the cover having an open position and a closed position; detection means for detecting whether the cover is in the open position; and means for stopping information processing by the information processing system responsive to an indication that the cover is in the open position.

DESCRIPTION OF THE ILLUSTRATIVE EMBODIMENT(S)

Figure 1:
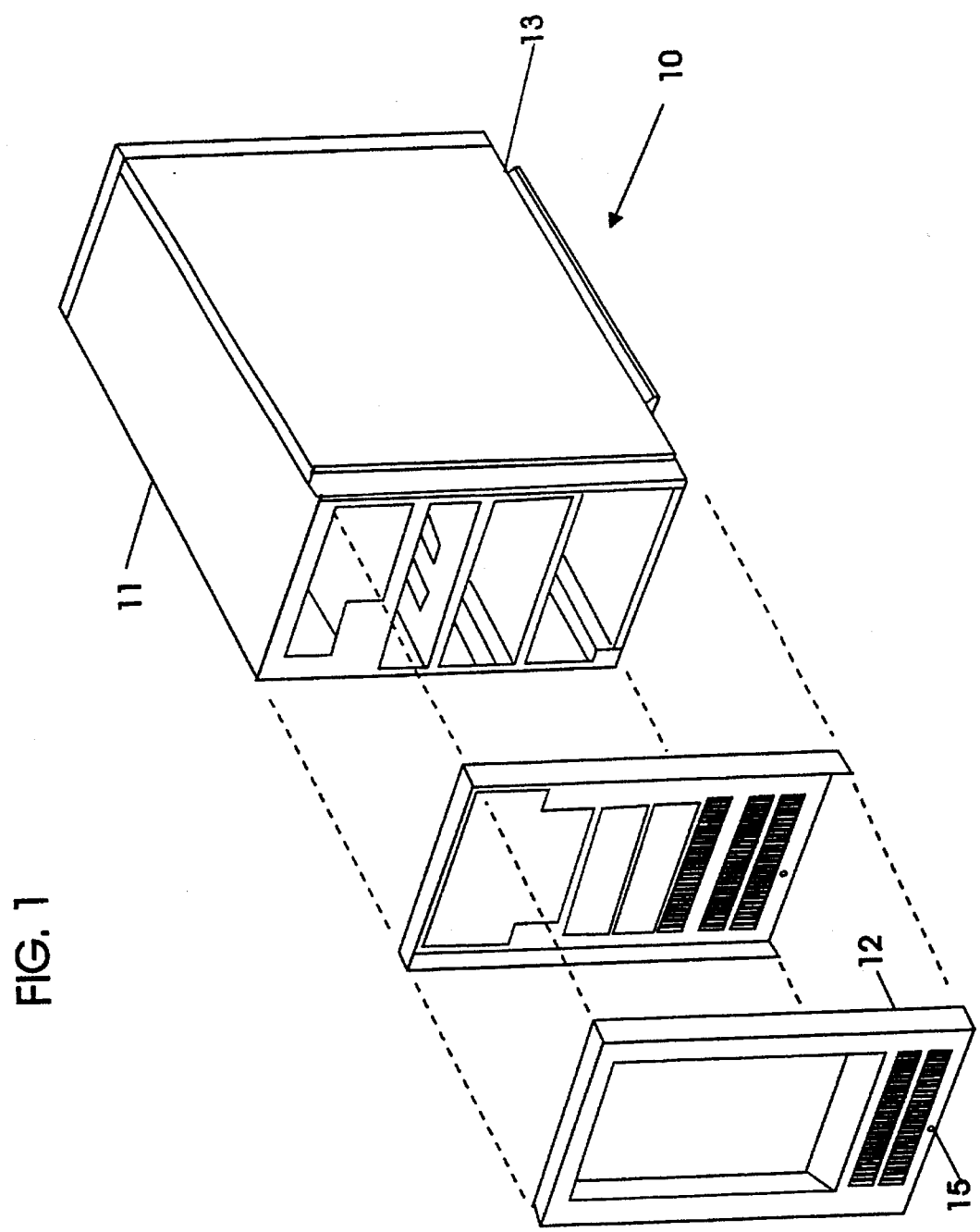
FIG. 1 shows a computer system in accordance with the invention in an open condition.

Referring to FIG. 1 there is shown a computer system 10 in an open condition wherein access to the inside of the computer system is available. The computer system 10 includes a housing or enclosure 11 having an opening 14 and a cover 12 that fits over the opening 14. The cover 12 includes a key-operated lock 15 for locking the enclosure 11 when the system 10 is in a closed condition. A side cover 13 is normally securely attached to the enclosure 11 and cannot be removed without removing the front cover 12 first.

Figure 2:
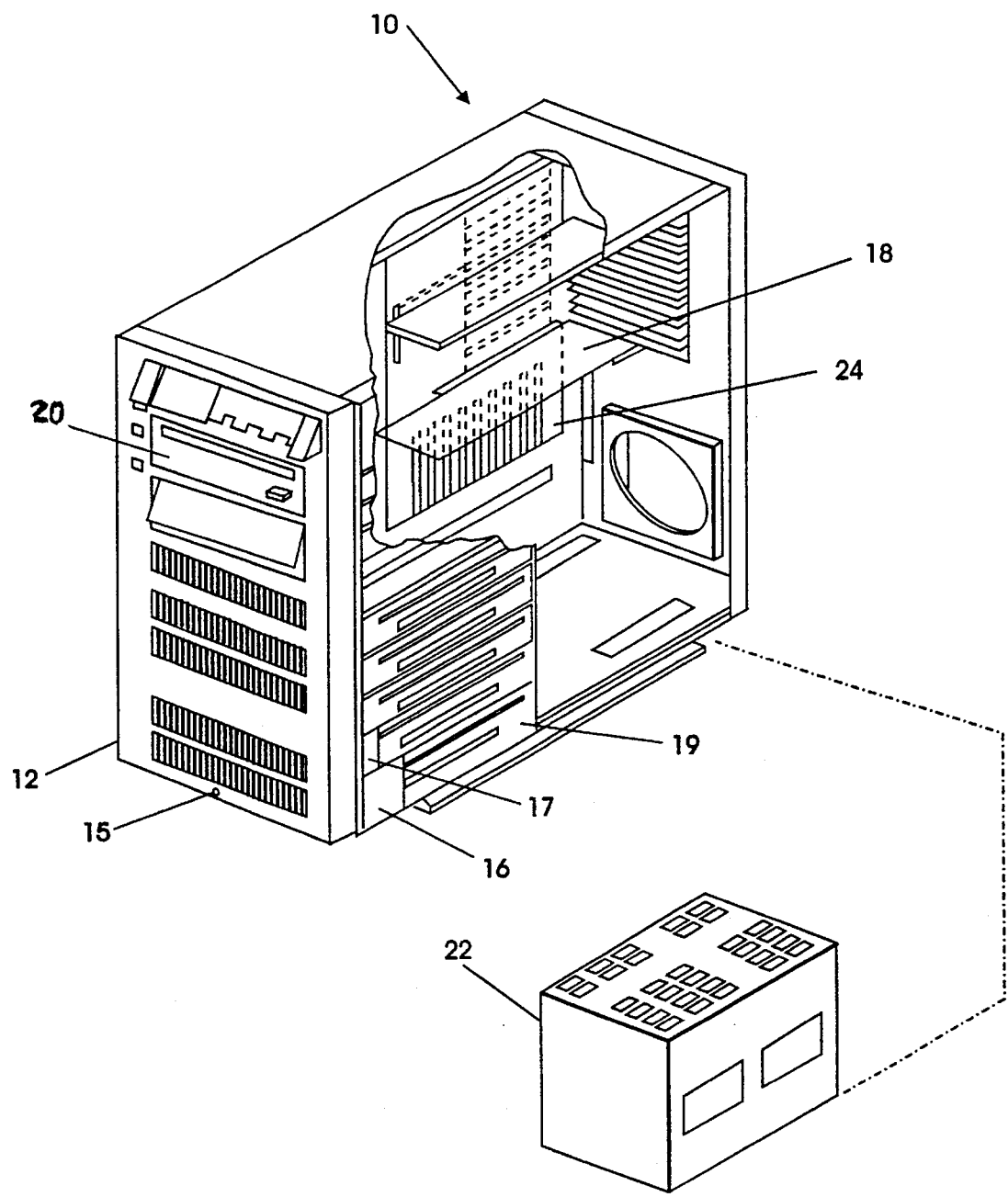
FIG. 2 shows the computer system of FIG. 1 in a closed condition.

Referring to FIG. 2, a cutaway view of the computer system 10 is shown. The front cover computer system 10 is in a closed condition wherein access to the inside of the computer system is not possible without opening the cover 12. In this Figure the side cover 13 has been removed to reveal the contents of enclosure 12. The computer system 10 includes an information processing apparatus located inside the housing 11. The information processing apparatus comprises a motherboard (or planar) 24 containing much of the circuitry for the information processing apparatus and providing connectors 18 for adapter cards to be connected to the system 10. A power supply 22, a hard disk drive 19, and a floppy disk drive 20 are also included in the housing 11.

In accordance with the invention, there are provided a first switch 16 and a second switch 17. The first switch 16 provides an indication of whether the housing 11 is in an open or closed state. The second switch provides an indication of whether the lock 18 is in a locked or unlocked state.

Figure 3:
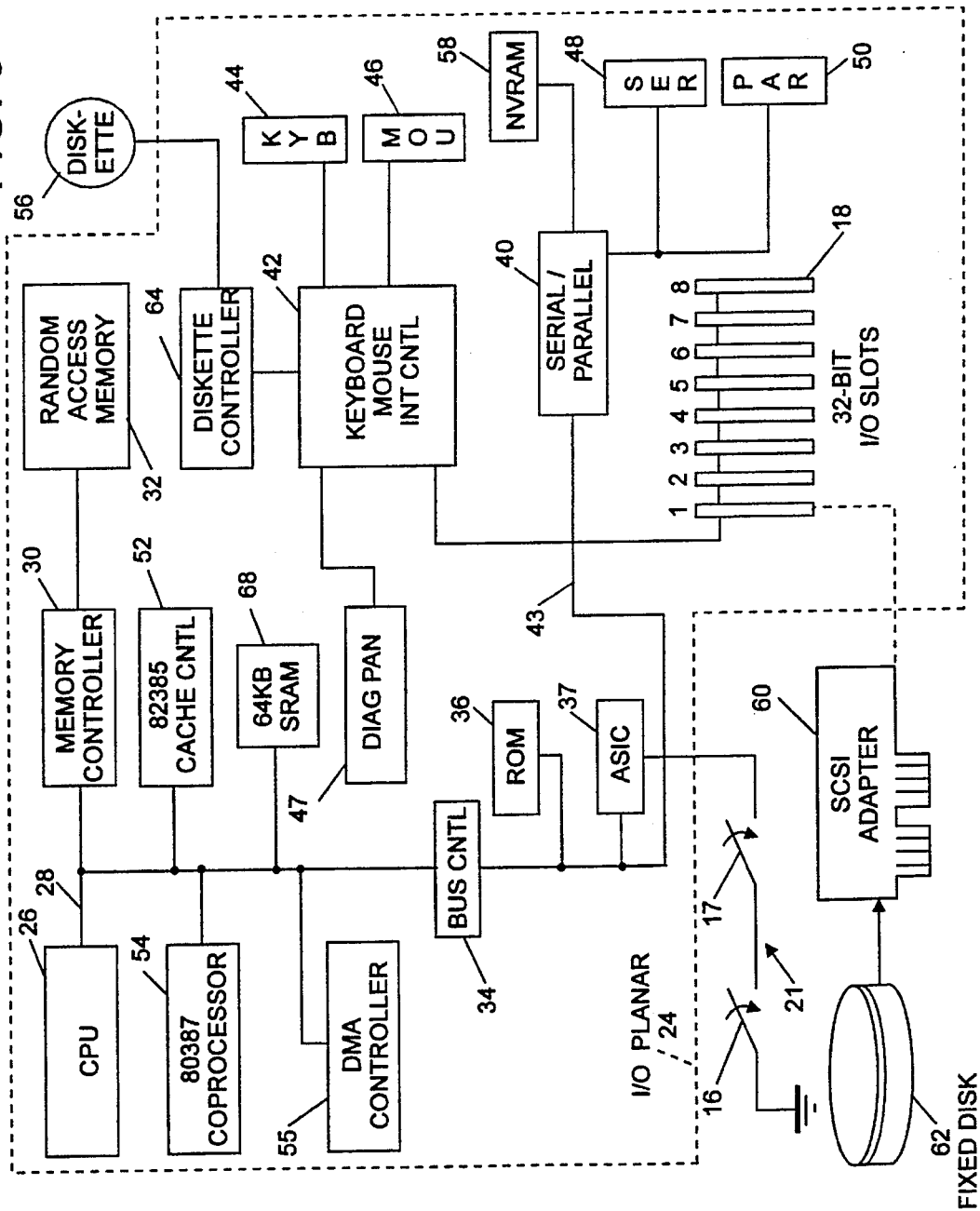
FIG. 3 shows a simplified block diagram of an information processing apparatus in accordance with the invention.

Referring to FIG. 3, there is shown a block diagram of the information processing circuitry of the personal computer system 10. FIG. 3 illustrates components of the planar 24 and the connection of the planar 24 to the I/O slots 18 and other hardware of the personal computer system. Located on the planar 24 is the system processor 26 comprising a microprocessor 26 which is connected by a local bus 28 to a memory controller 30, which is further connected to a random access memory (RAM) 32. While any appropriate microprocessor can be used, one suitable microprocessor is the 80486 which is sold by Intel.

While the present invention is described hereinafter with particular reference to the system block diagram of FIG. 3, it is to be understood at the outset of the description which follows, it is contemplated that the apparatus and methods in accordance with the present invention may be used with other hardware configurations of the planar board. For example, the system processor could be an Intel Pentium microprocessor.

The local bus 28 is further connected through a bus controller 34 to a read only memory (ROM) 36 on the planar 24. An additional nonvolatile memory (NVRAM) 58 is connected to the microprocessor 26 through a serial/parallel port interface 40 which is further connected to bus controller 34. The nonvolatile memory can be CMOS with battery backup to retain information whenever power is removed from the system. Since the ROM is normally resident on the planar, model and submodel values stored in ROM are used to identify the system processor and the system planar I/O configuration respectively. Thus these values will physically identify the processor and planar I/O configuration.

The NVRAM 58 is used to store system configuration data. That is, the NVRAM will contain values which describe the present configuration of the system. For example, NVRAM contains information describing the capacity of a fixed disk or diskette, the type of display, the amount of memory, time, date, etc. Additionally, the model and submodel values stored in ROM are copied to NVRAM whenever a special configuration program, such as SET Configuration, is executed. The purpose of the SET Configuration program is to store values characterizing the configuration of the system in NVRAM. Thus for a system that is configured properly, the model and submodel values in NVRAM will be equal respectively to the model and submodel values stored in ROM. If these values are not equal, this indicates that the configuration of the system has been modified.

Continuing the discussion with reference to FIG. 3, the bus controller 34 is further coupled to I/O slots 18, the serial/parallel interface 40 and peripheral controller 42 by an I/O planar bus 43. The peripheral controller 42 is further connected to a keyboard 44, mouse 46, diagnostic panel 47, and diskette controller 64. Beside the NVRAM 58, the serial/parallel interface 40 is further connected to a serial port 48 and parallel port 50 to input/output information to a printer, hard copy device, etc. As is well known in the art, the local bus 28 can also be connected to a cache controller 52, a cache memory 68, a co-processor 54, and a DMA controller 56.

The system processor 26 controls its internal operation as well as interfacing with other elements of the personal computer system 10. For example, system processor 26 is shown connected to a small computer system interface (SCSI) I/O card 60 which is further connected to a DASD, such as a fixed disk drive 62. It is to be understood that other than a SCSI disk drive/adapter can be used as a fixed disk in accordance with the present invention. In addition to the fixed disk 62, the system processor 26 can be interfaced to the diskette controller 64 which controls a diskette drive 66. With respect to terminology, it is also to be understood that the term "hardfile" describes fixed disk drive 62 while the term "floppy" also describes diskette drive 66.

Switches 16 and 17 are coupled in series to an unauthorized access monitor ASIC (application specific integrated circuit) 37 to provide a ground (or zero logic state) to an input of the ASIC 37 when both switches are closed. Switch 16 closes when the housing 11 is in a open state. Switch 17 closes when the lock 15 is in the locked state. In accordance with one aspect of the invention, the ASIC 37 provides an interrupt to the CPU 26 when a logical zero is detected at its input. Switches 16, 17, and ASIC 37 constitute an unauthorized access (U/A) monitor circuit 21.

When the system 10 is first powered-on a boot sequence begins that is first controlled by a basic input/output system stored in the ROM 106. The system conducts a power on self test (POST), loads an image of the ROM BIOS into RAM, and turns system control over to the operating system program in RAM.

Operationally, when the U/A monitor 21 detects an unauthorized access to the inside of housing 11 (i.e., an indication that access to the inside of housing 11 was achieved without unlocking the lock 15), the U/A monitor 21 generates an interrupt for the CPU 26 to stop processing information.

When the U/A monitor 21 is enabled the system 10 displays a message on the information panel and stops the system's processing if the tamper-evident covers are "tripped" while the system is operational.

The user is given an option to "Enable" (the default) or "Disable" the U/A Monitor via a program that is present on the information processing apparatus' system partition of the hard disk drive 114 or in a Reference Diskette. The user's choice is stored in battery-backed NVRAM 58.

Prior to booting the operating system, the power-on self test (POST) interrogates an NVRAM bit which defines a user's choice and sets a RIE (RAM-clear interrupt enable) if the user has chosen to "Enable" the interrupt. POST will not enable the interrupt if booting a Reference Diskette, system partition, or POST/BIOS Update Diskette.

BIOS support, upon receiving an interrupt which indicates that an unauthorized access has been attempted, writes error code 00017600 (the system has been tampered with) to the information panel and default video and halts the system. The net effect is that: (1) the system provides the user with an option to enable or disable the tamper-evidence interrupt; and (2) the system's default action upon receiving such an interrupt which is issued only if the user has previously installed the privileged-access password—is to stop. This "stop" is either effected via the BIOS function's issuance of a HLT instruction or, for those operating systems which choose not to use the BIOS support, by the operating system's receipt of an unknown interrupt at IRQ8 (the RTC interrupt level). The unknown interrupt scenario is believed to result in a system hang.

This default action, for those operating systems which perform "lazy" writes (e.g. OS/2) might result in loss of data if the tamper-detect interrupt is issued while there are unwritten file buffers present in memory.

Thus, the invention provides an unauthorized access monitor that indicates to a user whether there has occurred any unauthorized access to the information processing apparatus contained in the housing 11.

What is claimed is:

1. A computer system comprising:

an information processing apparatus for processing information;

a housing for enclosing the information processing apparatus, the housing including an opening for providing access to the information processing system;

a cover attached to the housing, the cover providing an open position and a closed position for the information processing apparatus;

a key-operated lock for locking the cover in the closed position; and means for stopping information processing by the information processing system responsive to an unauthorized physical access to the information processing apparatus.

2. The computer system of claim 1, further comprising:

detection means for detecting whether the cover is in the open position and whether the lock is a locked or unlocked position; and wherein the means for stopping information processing by the information processing system is responsive to an indication by the detection means that the cover is in the open position and the lock is in the locked portion.

3. The computer system of claim 2, wherein the detection means comprise a first switch for indicating whether the cover is in the open or the closed position and a second switch for indicating whether the lock is in the locked or unlocked position.

4. The computer system of claim 1, wherein the information processing apparatus comprises:

a system processor; and information storage means for storing at least programs for operating the information processing system.

* * * * *